United States Patent [19]

Huignard et al.

[11] Patent Number: 4,847,521
[45] Date of Patent: Jul. 11, 1989

[54] DEVICE FOR THE AMPLIFICATION OF LIGHT-SENSITIVE

[75] Inventors: Jean-Pierre Huignard, Paris; Brigitte Loiseaux, Villebon sur Yvette; Gauthier H. de Monchenault, Paris; Claude Puech, Longjumeau, all of France

[73] Assignee: Thomson-CSF, Paris, France

[21] Appl. No.: 136,756

[22] Filed: Dec. 22, 1987

[30] Foreign Application Priority Data

Dec. 23, 1986 [JP] Japan .................. 86 18092

[51] Int. Cl.$^4$ ............................................. G02F 1/35
[52] U.S. Cl. ........................................ 307/425; 372/21
[58] Field of Search ................. 330/4.3; 307/425, 430; 372/6, 21

[56] References Cited

U.S. PATENT DOCUMENTS

| | | | |
|---|---|---|---|
| 3,364,432 | 1/1968 | Boyd | 307/425 |
| 3,537,020 | 10/1970 | Anderson | 307/425 |
| 3,660,673 | 5/1972 | Anderson | 307/430 |
| 3,772,528 | 11/1973 | Anderson | 307/430 |
| 3,988,593 | 10/1976 | Dewey, Jr. | 307/425 |

FOREIGN PATENT DOCUMENTS 0061372 9/1982 European Pat. Off. .
2500937 9/1982 France .
2158602A 11/1985 United Kingdom .

OTHER PUBLICATIONS

"Nonlinear Refraction in Semiconductor Lasers (Review)," A. P. Bogatov et al., Soviet Journal of Quantum Electronics, vol. 15, No. 3, Mar. 1985, pp. 308–325, American Institute of Physics, Woodbury, New York.
"Lichtinduzierte, thermische Phasengitter in absorbierenden Flüssigkeiten," H. Eichler et al., Zeitschrift Für Angewandte Physik, vol. 31, No. 1, Jan. 1971, pp. 1–4.

Primary Examiner—William L. Sikes
Assistant Examiner—B. Randolph Holloway
Attorney, Agent, or Firm—Oblon, Fisher, Spivak, McClelland & Maier

[57] ABSTRACT

A device for the amplification of optical signals comprises a light-sensitive medium receiving a modulated signal optic wave and a pump wave, in which the response time of the light-sensitive medium is substantially greater than the mean period for the modulation of the signal wave. The device can be applied to optical transmission in telecommunications.

5 Claims, 3 Drawing Sheets

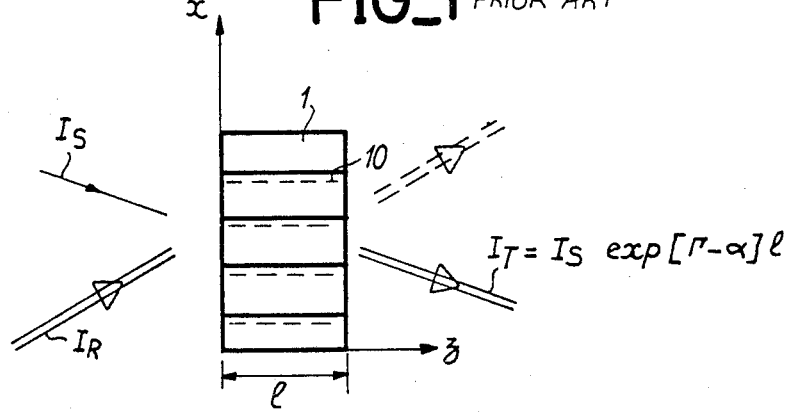
FIG_1 PRIOR ART
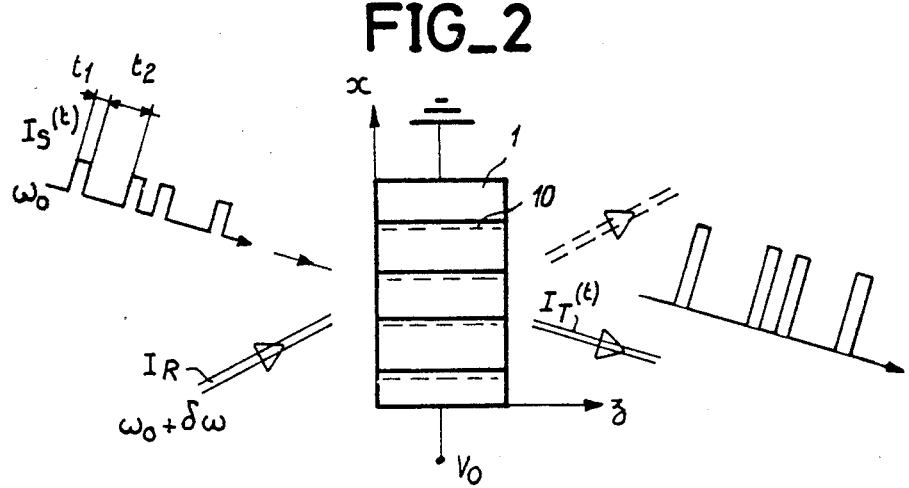
FIG_2
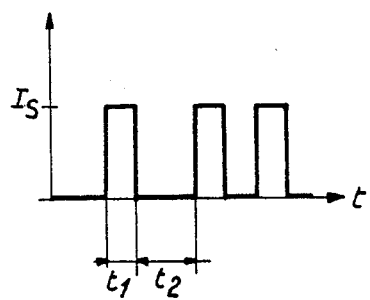
FIG_3
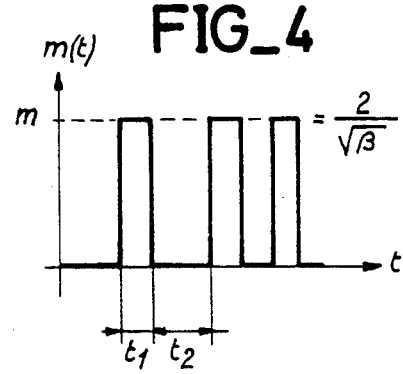
FIG_4

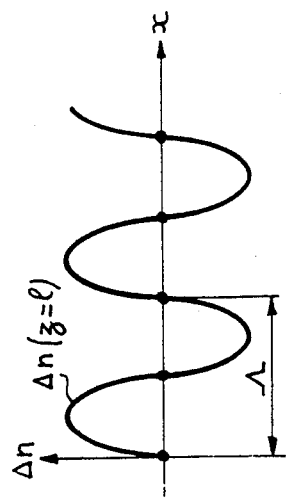
FIG_6
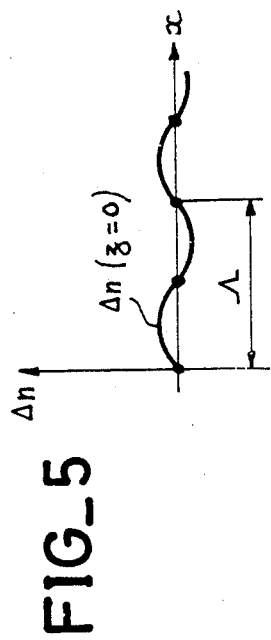
FIG_5
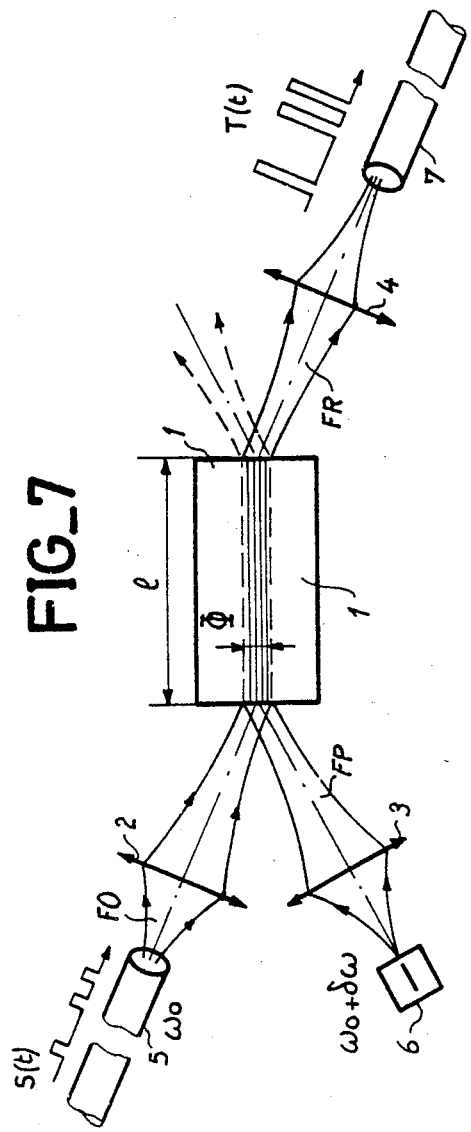
FIG_7

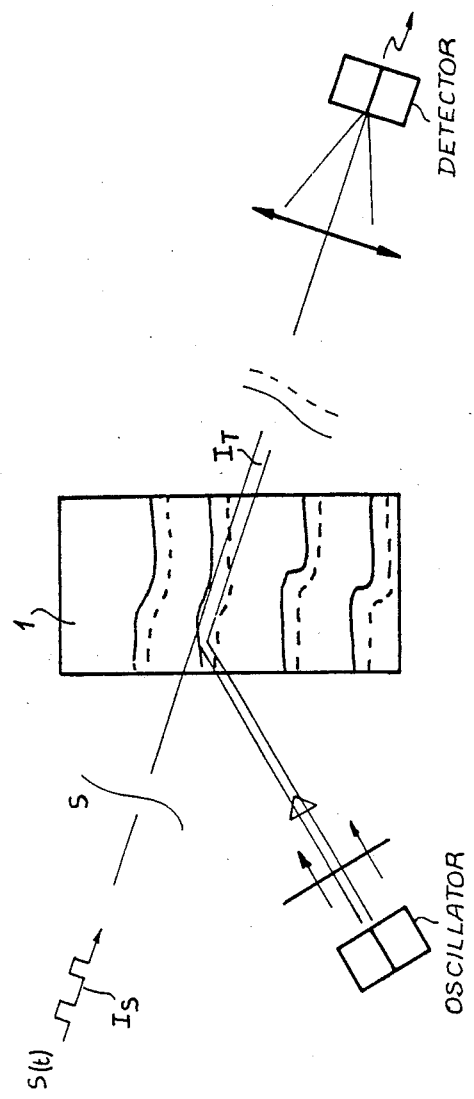

DEVICE FOR THE AMPLIFICATION OF LIGHT-SENSITIVE

BACKGROUND OF THE INVENTION

1. Field of the Invention

The invention pertains to a device for the amplification of light-sensitive medium optic signals used to amplify a temporally modulated signal wave at high frequency. According to the invention, the amplification results from wave-coupling phenomena in light-refracting crystals. This device has a high-pass type of response which permits the amplification of high-frequency modulated signals. The applications relate to the optical processing of the signals and especially to the regeneration and amplification of signals coming from an optic fiber.

2. Description of the Prior Art

Devices for the amplification of light waves using light-sensitive elements have already been experimented with.

The French patent filed on Feb. 27th, 1981 under the number 81.03989 and published under the number 2 500 937 describes an optic device to maintain a radiant energy pulse circulating in a waveguide. This device uses a light-refracting medium, in which the signal to be maintained interferes, and a pumping wave. A transfer of energy takes place from the pumping beam towards the signal to be maintained.

The French patent filed on Mar. 13th, 1981 under the number 81.01535 and published under the number 2 501 872 also describes an optic device for the real-time amplification of the radiant energy of a beam. This amplifier uses a light-sensitive recording material in which a beam to be amplified and a reference beam interfere. These beams create a grating of indices strata in the light-sensitive medium. Energy is transferred between the reference beam and the target beam, adding energy to the target beam. To work in optimum energy transfer conditions, this amplifier provides for a displacement of the interference fringes either through a mechanical displacement of the light-sensitive recording material or through the phase modulation of one of the beams.

However, prior art system cannot be used to amplify pulse trains that occur at high frequencies, such as the pulse trains transmitted in optical telecommunications. For the inertia of light-sensitive media does not permit the amplification of these pulse trains.

The device of the invention, by contrast, takes advantage of this inertia to enable the amplification of pulses occurring at high frequencies.

SUMMARY OF THE INVENTION

The invention therefore pertains to a device for the amplification of light-sensitive medium optic signals, the said device comprising:

a medium with with light-induced variations in indices;

a first source emitting a signal optic wave towards the light-sensitive medium;

A second source emitting a pump optic wave also towards the light-sensitive medium;

with the signal optic wave and the pumping optic wave interfering in the light-sensitive medium;

a device wherein the signal optical wave is modulated at high frequency and has a defined wavelength, the pumping optical wave has a very slightly different wavelength and the response time of the said medium at recording and erasure has a value which is appreciably greater than the mean modulation period of the signal wave.

BRIEF DESCRIPTION OF THE DRAWINGS

The various objects and features of the invention will emerge more clearly from the following description given by way of example and made with reference to the appended figures, of which:

FIG. 1 is a two-wave coupling device in a light-refracting crystal according to the prior art;

FIG. 2 is a device for the amplification of a pulse train according to the invention;

FIGS. 3 to 6 are curves of the functioning of the device of the invention;

FIG. 7 is an examnple of the device of the invention;

FIG. 8 is a explanatory diagram of the device of the invention.

DETAILED DESCRIPTION OF THE INVENTION

The device of the invention is based on two-wave coupling phenomena observed in non-linear materials with light-induced index variations such as light-refracting crystals, the principle of which is recalled in FIG. 1. A pump wave (or reference wave) $I_R$ and a low-intensity signal wave $I_S$ interfere in the volume of the light-refracting crystal 1 (BSO, Ga, As, etc). The phenomena of the self-diffraction of the pump wave $I_R$ by the grating 10, light-induced in the volume of the crystal 1, lead the amplification of the signal wave $I_S$ if there is a phase shift of $\pi/2$ between the index grating and the interference figure. In light-refracting crystals, it is now well known that this shift is obtained by either of the following techniques:

recording at zero field $E_o=0$ by the diffusion of photocarriers ($BaTiO_3$, $LiNbO_3$, $KNbO_3$), recording under high applied field, for example $E_o=10$ kV.cm$^{-1}$, and displacement of the interference figure at constant speed. This displacement of the interference figure is obtained by a frequency shift of one of the pump waves or signal waves (BSO, BGO, etc.).

According to either of these recording techniques, high gains in the light-refracting amplifier were obtained in continuous mode for low incident laser power values ($I_o<1$ W.cm$^{-2}$). For example, for optimized recording conditions in $BaTiO_3$ or BSO, the intensity of a signal beam is amplified by a factor of $10^3$ to $10^4$ after energy transfer from the pump. These amplifying conditions are obtained for an interaction length of about 5 to 10 mm. for the crystal and for a ratio between the intensities of the pump/signal beams of about:

$\beta = IR_o/IR_o = 10^3$

Depending on the materials used, the time constant for the establishment of the light-induced grating varies from 10 ms (BSO) to 1 second ($BaTiO_3$) for an incident power density on the crystal of 100 mW.cm$^{-2}$ at the Argon laser wavelength $\lambda=514$ nm. Although the response time of the amplifier is relatively long, the object of the present inventiuon uses the inertia of the crystal to obtain the amplification of a high-frequency amplitude-modulated signal wave, namely for a modulation reference meeting the following condition $f_m >> 1/\pi\tau$; $\tau$ being the response time of the crystal to recording and erasing.

The diagram of the device according to the invention is indicated in FIG. 2. The signal beam $I_S$ is formed by the pulse train (duration $t_1$; cycle $t_1+t_2$) interferes in the light-refracting crystal with a reference wave. Depending on the material used, the spatial shift between the interference figure and the light-induced index variation is obtained either by zero field recording ($E_o=0$) by diffusion of photocarriers or by recording in an applied field $E_o \neq 0$ and shifting of the interference figure at constant speed as indicated above.

According to the invention, $\omega_o$ being the mean wavelength of the signal beam $I_S$, the controlled shift of the interference figure is obtained by a frequency shift $\delta\omega$ of the reference wave with respect to the signal wave: $\delta\omega \approx 1/\tau$, $\tau$ being the response time of the crystal (BSO, BGO, GaAs etc.).

The response time of the light-refracting material is controlled by the intensity of the pump beam. Typically, the following values are got corresponding to an incident intensity on the pump wave of $I_o=10$ mW.cm$^{-2}$. To illustrate the invention, it is indicated that the response time of the light-refracting crystal at recording and erasure may have the following values:

$\tau \approx 1$ second for BaTiO$_3$,
$\tau \approx$ some 10 ms for BSO, BGO.

Under these recording conditions, a continuous signal beam of very low intensity is amplified by a factor $10^2 - 10^3$ after interaction with the pump wave (length of crystal: $l \approx 5-10$ mm). The object of the invention, therefore, is to obtain high gains when the signal beam is modulated temporally at high frequency. This new type of amplifier with a very wide pass-band (with a high-pass type or response) therefore offers new prospects for the optic processing of the signal and the regeneration of the pulses in an optic transmission line.

The interference of the modulated beam with the reference wave creates an interference figure in the volume of the crystal, the modulation rate of which is variable with time. For the signal $I_S$ indicated in FIG. 3, the modulation rate m shown in FIG. 4 develops cyclically from the value $m(t)=m$ (m being the modulation rate corresponding to the continuous signal) to the value $m(t)=0$ (partial erasure of the grating by uniform illumination with a pump wave);

$$m = 2\sqrt{\frac{I_S}{I_R}}.$$

This gives $m=0.02$ for $I_R=10^4 \times I_S$.

The distribution of light intensity in the interference fringes is written as follows in these conditions;

$I(x,t) = I_0[1 + m(t)\cos Kx]$ $m(t) = m \quad 0 < t < t_1$ $m(t) = 0 \quad t_1 < t < t_1 + t_2$ In view of the inertia of the crystal, the index variation $\Delta n$ induced at the stationary state in the light-refracting crystal depends only on the mean value of the light intensity received by the crystal, namely:

$\Delta n(x) = \Delta n_s \cdot m(t) \cdot \cos(Kx + \pi/2)$

-continued $\Delta n(x) = \Delta n_s \cdot m \dfrac{t_1}{t_1 + t_2} \cos(Kx + \pi/2)$ m = rate of modulation corresponding to the continuous signal ($t_2=0$; $I_S$)$\Delta n$: the maximum value of the index variation that can be induced in the crystal.

Since the crystal records only the mean value in time of the interference figure, the intensity of the signal beam can be modulated at high frequency. The index grating is registered for any modulation frequency $f_m$ such that:

$$f_m >> \frac{1}{2\pi\tau}$$

The crystal therefore behaves like a high-pass filter, the cut-off frequency of which equals:

$f_c = 1/2\pi\tau$ namely, for $\tau=10$ ms (BSO crystal), $f_c \approx 20$ Hz. The index grating is therefore recorded in the crystal for any modulation of the intensity of the wave at a frequency $f_m$ greater than 20 Hz. In particular, the fast modulations ($f_n$ MHZ-GHz) are suitable. The grating thus made in the light-refracting crystal is amplified by wave coupling-phenomena. (The self-diffraction off the pump wave in the light-induced grating). The index variation after crossing the crystal is equal to:

$\Delta n(z=l) = \Delta n(z=0) \times \exp \Gamma l/2$ $\Gamma$ = gain coefficient of light-refracting crystal. The diffraction capacity 7 of a grating of this type with a modulation depth that varies very quickly as a function of z is written.

$$\eta = \frac{4}{\beta}\left(\frac{t_2}{t_1 + t_2}\right)^2 \times \exp\Gamma l$$

The gain coefficient $\Gamma$ is intrinsic to the crystal used and its value depends on the recording conditions of the grating (no fringes, applied field, etc.) Values of the gain coefficient $\Gamma$ ranging from 3 to 20 per cm. have been measured in most of the usual light-refracting crystals.

The amplitude of the signal wave transmitted by the crystal after interaction with the pump wave can be put in the form:

$T_1 = S + \sqrt{\eta} \times R \quad 0 < t < t_1$ $T_2 = \sqrt{\eta} \times R \quad t_1 < t < t_1 + t_2$ R being the amplitude of the reference wave.

The differential gain on the intensity of the signal transmitted is therefore equal to:

$$G_{diff} = \frac{(T_1)^2 - (T_2)^2}{I_S}$$

We therefore get the following expression of the gain of the amplifier.

$$G_{diff} = \frac{4t_1}{t_1 + t_2} \exp\frac{\Gamma l}{2}$$

In view of the values of Γ measured in different crystals, a high-frequency modulated low-intensity incident signal is amplified according to the following conditions:

for a crystal length $l=1$ cm., a periodic pulse ratio $t_2/t_2=1$ and a gain coefficient of the light-refracting crystal of $\Gamma=4$ cm$^{-1}$, we obtain an amplifier gain of $G_{diff}=15$.

For a light-refracting crystal gain coefficient with a value of $\Gamma=8$ cm$^{-1}$, we get $G_{diff}=110$.

It will be noted that the signal is amplified around a component with a mean intensity equal to:

$I_M \simeq I_S \exp \Gamma l$

The signal amplifier device for an optic transmission line which is the subject of the present invention is shown schematically in FIG. 7.

The signal wave that takes the shape of a pulse train, coming from the single-mode or multiple-mode fibre 505, interferes in the crystal 1 with the wave coming from a single-mode semiconductor laser 6 that acts as a local oscillator. The stability of frequency between the two waves provides for the recording of the dynamic hologram in the light-refracting crystal chosen according to its field of spectral sensitivity, (for example GaAs, a light-sensitive crystal at the wavelengths $\lambda=0.85$ μm or $\lambda=1.3$ μm). The phenomena in which energy is transferred from the pump wave to the signal wave, as explained earlier, enables the amplification of the pulse trains without limiting the pass-band (a function of amplification with high-pass type frequency response curve). The signal thus amplified can be detected on a photodiode (with a filtering of the continuous component) or, as shown in the figure, it can be re-injected into a single-mode or multiple-mode optical fiber.

Since the light beam emitted by the fiber 5 is divergent, there is a focusing device 2 that focuses the beam in the light-refracting crystal 1. A focusing device 3 also focuses the light beam emitted by the source 6. The light-refracting crystal 1 and the focusing devices 2 and 3 are focused so that the light-refracting crystal is located at a common focusing point of the beams that come from the fiber 5 and the source 6.

Thus, the phenomena of interference and amplification for energy transfer are at the maximum.

Another focusing device 4 focuses the amplified beam coming from the light-refracting crystal 1 and focuses it on an input side of the fiber 7.

For example, an amplifier with a light-refracting crystal made of gallium arsenide may be made by providing for a recording of zero-field strata by the diffusion of photocarriers and by using, for the local oscillator, a semiconductor laser with a wavelength $l=1.3$ um with an emitting power of 1 mW.

A dynamic hologram can be obtained with:
A diameter $\phi=100$ μm;
A strata pitch $\Lambda \simeq 1$ μm;
An interaction length of $\rho=10$ mm.;
The power density applied to the light-refracting crystal is:

$P=10$ W/cm$^2$.

A light-refracting crystal GaAs, with a response time of $\tau \simeq 1$ microsecond has been chosen.

The frequency stability between the pump and signal waves has been kept below $(2\pi\tau)^{-1}$:

$Sf<(2\pi\tau)^{-1}$ giving $Sf<0.2$ MHz

Since the light-refracting crystal (GaAs) has a gain coefficient of $\Gamma \simeq 5$ cm, we get, for the time $t_1$ and $t_2$ which are substantially equal, an amplification gain:

$G_{diff}=2 \exp \Gamma l/2$ giving $G_{diff}=25$

The amplifier is compatible with the use of signal beam coming from a multiple-mode fiber since each component of the plane wave coming from the fiber interferes coherently with the pump wave.

The detection is of the homodyne type, namely the signal detected results from the coherent superimposition of the two following waves:
Signal wave=S
Self-diffracted wave=$\sqrt{\eta}P$ The self-diffracted wave acts as a local oscillator wave with its phase strictly matched at every point with that of the incident signal wave (FIG. 8).

In the above embodiment, it has been assumed that the light-sensitive medium is a light-refracting crystal. However, the invention can also be applied in general to a device where the light-sensitive medium is made of a index variation material with a time constant for the establishment of the phenomenon such as, for example, materials with thermal index variations or materials generating carriers in semiconductors.

Furthermore, it is clear that the numerical examples have been given only to illustrate the description and that other alternatives may be considered without going beyond the scope of the invention.

What is claimed is:

1. A device for the amplification of light-sensitive medium optic signals, said device comprising:
    a medium with light-induced variations in indices;
    a first source emitting a signal optic wave towards said light-sensitive medium;
    a second source emitting a pump optic wave directly at said light-sensitive medium;
    with the signal optic wave and the pumping optic wave interfering in the light-sensitive medium;
    wherein the signal optical wave is modulated at high frequency and has a defined wavelength, the pumping optical wave has a very slightly different wavelength and the response time of the said medium at recording and erasure has a value which is greater than the mean modulation period of the signal wave.

2. A device for the amplification of light signals in a light-sensitive medium according to claim 1, comprising a first focusing device that focuses the signal wave substantially at the center of the light-refracting medium, a second focusing device that also focuses the pump wave substantially at the center of the light-sensitive medium, the said center being at the focusing point of the two signal and pump waves.

3. An amplification device according to claim 1, wherein the medium with light-induced index variations is a light-refracting crystal.

4. An amplification device according to claim 1, the medium with light-induced index variations is a a medium with a thermal index variation.

5. An amplification device according to claim 1, the medium with light-induced index variations is a medium which generates carriers in a semiconductor.

* * * * *

UNITED STATES PATENT AND TRADEMARK OFFICE
CERTIFICATE OF CORRECTION

PATENT NO. : 4,847,521

DATED : Jul 11, 1989

INVENTOR(S) : Jean-Pierre HUIGNARD, et al

It is certified that error appears in the above-identified patent and that said Letters Patent is hereby corrected as shown below:

On the Title Page, Item [54], the title is incorrect.
It should read as follows:

--Device for the Amplification of Light-Sensitive Medium Optic Signals--

Signed and Sealed this

Fifteenth Day of May, 1990

*Attest:*

HARRY F. MANBECK, JR.

*Attesting Officer*  *Commissioner of Patents and Trademarks*